(12) United States Patent
Bank

(10) Patent No.: US 6,885,753 B2
(45) Date of Patent: Apr. 26, 2005

(54) COMMUNICATION DEVICE USING BONE CONDUCTION

(75) Inventor: Graham Bank, Woodbridge (GB)

(73) Assignee: New Transducers Limited, Cambridgeshire (GB)

( * ) Notice: Subject to any disclaimer, the term of this patent is extended or adjusted under 35 U.S.C. 154(b) by 62 days.

(21) Appl. No.: 10/190,604

(22) Filed: Jul. 9, 2002

(65) Prior Publication Data

US 2003/0048915 A1 Mar. 13, 2003

Related U.S. Application Data

(63) Continuation-in-part of application No. 09/768,002, filed on Jan. 24, 2001.
(60) Provisional application No. 60/303,802, filed on Jul. 10, 2001, provisional application No. 60/218,062, filed on Jul. 13, 2000, provisional application No. 60/205,465, filed on May 19, 2000, and provisional application No. 60/178,315, filed on Jan. 27, 2000.

(30) Foreign Application Priority Data

Jul. 10, 2001 (GB) .............................................. 0116767

(51) Int. Cl.[7] .............................................. H04R 25/00
(52) U.S. Cl. ..................................... 381/326; 381/151
(58) Field of Search ................................. 381/151, 312, 381/326, 327, 328, 330, 380, 381, 23.1, 322, 162, 163, 361, 367, 173, 190

(56) References Cited

U.S. PATENT DOCUMENTS

| | | |
|---|---|---|
| 4,078,160 A | 3/1978 | Bost |
| 4,150,262 A | 4/1979 | Ono |
| 4,401,857 A * | 8/1983 | Morikawa .................... 381/182 |
| 4,414,436 A | 11/1983 | Sashida et al. |
| 4,481,663 A | 11/1984 | Spranger |
| 4,593,160 A | 6/1986 | Nakamura |
| 5,448,637 A | 9/1995 | Yamaguchi et al. |
| 5,632,841 A | 5/1997 | Hellbaum et al. |
| 5,684,884 A * | 11/1997 | Nakaya et al. ............... 381/190 |
| 6,023,515 A * | 2/2000 | McKee et al. ............... 381/150 |
| 6,332,029 B1 | 12/2001 | Azima et al. |
| 2002/0039427 A1 | 4/2002 | Whitwell et al. |

FOREIGN PATENT DOCUMENTS

| | | |
|---|---|---|
| EP | 0 351 461 A1 | 1/1990 |
| EP | 0 517 497 B1 | 12/1992 |

(Continued)

OTHER PUBLICATIONS

Jonathan R. Bost et al., "A New Piezoelectric Driver Enhances Horn Performance", Audio Engineering Society, Presented at the 60th Convention, May 2–5, 1978, Preprint No. 1374, pp. 1–14..

Patent Abstracts of Japan, vol. 005, No. 159 (E–077), Oct. 14, 1981 & JP 56 089200 (Matsushita Electric Ind. Co., Ltd.), Jul. 20, 1981.

Patent Abstracts of Japan, vol. 016, No. 435 (E–1263), Sep. 10, 1992 & JP 04 152000 (Takao Kanbe), May 25, 1992.

Patetn Abstracts of Japan, vol. 1998, No. 03, Feb. 27, 1998 & JP 09 298792 (Hara Izumi; Yamamoto Minoru), Nov. 18, 1997.

*Primary Examiner*—Curtis Kuntz
*Assistant Examiner*—Brian Ensey
(74) *Attorney, Agent, or Firm*—Foley & Lardner LLP

(57) ABSTRACT

A communication device comprising a microphone, a conduction interface and an electromechanical force transducer mounted to the conduction interface to drive the interface to conduct sound to a user by bone conduction, characterised in that the transducer has an intended operative frequency range and comprises a resonant element having a frequency distribution of modes in the operative frequency range and coupling means for mounting the transducer to the interface.

16 Claims, 5 Drawing Sheets

FOREIGN PATENT DOCUMENTS

| | | |
|---|---|---|
| EP | 0 564 874 A1 | 10/1993 |
| EP | 0 711 096 A1 | 5/1996 |
| EP | 0 881 856 A1 | 12/1998 |
| GB | 2 166 022 A | 4/1986 |
| WO | WO 83/02364 A1 | 7/1983 |
| WO | WO 96/31333 A1 | 10/1996 |
| WO | WO 97/09842 A2 | 3/1997 |
| WO | WO 98/52383 A1 | 11/1998 |
| WO | WO 98/58416 A1 | 12/1998 |
| WO | WO 98/58521 A1 | 12/1998 |
| WO | WO 99/41939 A1 | 8/1999 |
| WO | WO 00/13464 A1 | 8/2000 |
| WO | WO 01/28195 A1 | 4/2001 |
| WO | WO 01/54450 A2 | 7/2001 |
| WO | WO 01/87007 A1 | 11/2001 |
| WO | WO 01/97489 A1 | 12/2001 |

* cited by examiner

COMMUNICATION DEVICE USING BONE CONDUCTION

This application claims the benefit of provisional application No. 60/303,802, filed Jul. 10, 2001 (incorporated by reference in its entirety) and is a continuation-in-part application of U.S. application Ser. No. 09/768,002, filed Jan. 24, 2001, which claims the benefit of U.S. provisional Nos. 60/178,315, filed Jan. 27, 2000; 60/205,465, filed May 19, 2000 and 60/218,062, filed Jul. 13, 2000.

TECHNICAL FIELD

The invention relates to communication devices such as telephones, headsets or hearing aids which use bone conduction to transmit sound to a user.

BACKGROUND ART

Bone conduction is an established technique which enables deaf people to communicate. Typical examples comprise a transducer which is mounted adjacent a user's ear so as to transmit sound to a user via conduction through the mastoid bone. However, known devices suffer from drawbacks such as excess pressure on the skull and the necessity of a heavy transducer means that their use is limited. For example, known hearing devices are currently manufactured by HiSonic and Viennatone but both devices use large and heavy transducers. Thus the devices are somewhat uncomfortable and cumbersome.

Traditional headsets have an earpiece and microphone connected together and thus care must be taken to avoid acoustical feedback. Hearing devices also suffer from this common problem of local feedback.

Similarly, in all telecommunications applications, the handset must comprise a microphone and an earpiece since it is necessary to transmit speech from a user to a microphone and onwards to a remote listener. A similar process occurs for communication to be transmitted from the remote listener to the user. Thus, if there is any acoustical coupling between the microphone and earpiece in the handset, some form of feedback through the transmission network will occur. Accordingly, a normally fully duplex telecomms network has to switch between different modes to combat this problem.

It is an object of the invention to provide improved communications device in which these known problems of weight and feedback are alleviated.

SUMMARY OF THE INVENTION

According to the invention, there is provided a communication device comprising a microphone, a conduction interface and an electromechanical force transducer mounted to the conduction interface to drive the interface to conduct sound to a user by bone conduction, characterised in that the transducer has an intended operative frequency range and comprises a resonant element having a frequency distribution of modes in the operative frequency range and coupling means on the resonant element for mounting the transducer to the interface. In use, the conduction interface may be mounted adjacent a user's mastoid bone.

The resonant element may be active e.g. may be a piezoelectric transducer and may be in the form of a strip of piezoelectric material. Alternatively, the resonant element may be passive and the transducer may further comprise an active transducer, e.g. an inertial or grounded vibration transducer, actuator or exciter, e.g. moving coil transducer.

The active transducer may be a bender or torsional transducer (e.g. of the type taught in WO00/13464 and corresponding U.S. application Ser. No. 09/384,419). Furthermore, the transducer may comprise combination of passive and active elements to form a hybrid transducer.

A number of transducer, exciter or actuator mechanisms have been developed to apply a force to a structure, e.g. an acoustic radiator of a loudspeaker. There are various types of these transducer mechanisms, for example moving coil, moving magnet, piezoelectric or magnetostrictive types. Typically, electrodynamic speakers using coil and magnet type transducers lose 99% of their input energy to heat whereas a piezoelectric transducer may lose as little as 1%. Thus, piezoelectric transducers are popular because of their high efficiency.

There are several problems with piezoelectric transducers, for example, they are inherently very stiff, for example comparable to brass foil, and are thus difficult to match to an acoustic radiator, especially to the air. Raising the stiffness of the transducer moves the fundamental resonant mode to a higher frequency. Thus such piezoelectric transducers may be considered to have two operating ranges. The first operating range is below the fundamental resonance of the transducer. This is the "stiffness controlled" range where velocity rises with frequency and the output response usually needs equalisation. This leads to a loss in available efficiency. The second range is the resonance range beyond the stiffness range, which is generally avoided because the resonances are rather fierce.

Moreover, general teaching is to suppress resonances in a transducer, and thus piezoelectric transducers are generally used only used in the frequency range below or at the fundamental resonance of the transducers. Where piezoelectric transducers are used above the fundamental resonance frequency it is necessary to apply damping to suppress resonance peaks.

The problems associated with piezoelectric transducers similarly apply to transducers comprising other "smart" materials, i.e. magnetostrictive, electrostrictive, and electret type materials. Various piezoelectric transducers are also known, for example as described in EP 0993 231A of Shinsei Corporation, EP 0881 856A of Shinsei Corporation, U.S. Pat. No. 4,593,160 of Murata Manufacturing Co. Limited, U.S. Pat. No. 4,401,857 of Sanyo Electric Co Limited, U.S. Pat. No. 4,481,663 of Altec Corporation and UK patent application GB2,166,022A of Sawafuji. However, it is an object of the invention to employ an improved transducer.

The transducer used in the present invention may be considered to be an intendedly modal transducer. The coupling means may be attached to the resonant element at a position which is beneficial for coupling modal activity of the resonant element to the interface. The parameters, e.g. aspect ratio, bending stiffness, thickness and geometry, of the resonant element may be selected to enhance the distribution of modes in the resonant element in the operative frequency range. The bending stiffness and thickness of the resonant element may be selected to be isotropic or anisotropic. The variation of bending stiffness and/or thickness may be selected to enhance the distribution of modes in the resonant element. Analysis, e.g. computer simulation using FEA or modelling, may be used to select the parameters.

The distribution may be enhanced by ensuring a first mode of the active element is near to the lowest operating frequency of interest. The distribution may also be enhanced by ensuring a satisfactory, e.g. high, density of modes in the operative frequency range. The density of modes is preferably sufficient for the active element to provide an effective mean average force which is substantially constant with frequency. Good energy transfer may provide beneficial smoothing of modal resonances. Alternatively, or additionally, the distribution of modes may be enhanced by distributing the resonant bending wave modes substantially evenly in frequency, i.e. to smooth peaks in the frequency response caused by "bunching" or clustering of the modes. Such a transducer may thus be known as a distributed mode transducer or DMT.

Such an intendedly modal or distributed mode transducer, actuator, exciter or driver is described in International patent application WO01/54450 and corresponding U.S. application Ser. No. 09/768,002 filed Jan. 24, 2001 (the latter of which is herein incorporated by reference in its entirety).

The communication device may be a telephone having a casing. The casing may be formed with an extension remote from the microphone, the transducer being mounted in the extension whereby in use the transducer is adjacent a user's mastoid bone. Thus, the user receives information from the structure of the device and thus communication is no longer airborne acoustic and the effects of acoustical feedback should be reduced. Since no direct acoustical input to the ear canal is needed, a user may use an earplug with high attenuation, for example, for noisy environments.

Alternatively, the communication device may be a hearing aid, which may be mounted in a pair of spectacles or may be disposable. Such hearing aids may provide sensory augmentation for blind people, for example by sensing the surroundings and providing signals which represent different surfaces and distance to the surfaces. Since the device should be free of feedback, the location signals should not be confused.

Alternatively, the communication device may be a headset, for example, for use in telephone call centres.

The advantages are that the transducer may be manufactured at very low cost and thus the communication devices may be disposable. Furthermore, the transducers may be low weight and small, e.g. less than 3 grams, but still having a high conversion efficiency. Thus they may be used in devices, e.g. in mobile telephones, where previous bone conduction arrangements are unsuitable, because of their weight and bulkiness. The communication devices using intendedly modal transducers for bone conduction may have also reduced acoustic feedback.

The transducer may comprise a plurality of resonant elements each having a distribution of modes, the modes of the resonant elements being arranged to interleave in the operative frequency range and thus enhance the distribution of modes in the transducer as a whole device. The resonant elements may have different fundamental frequencies and thus, the parameters, e.g. loading, geometry or bending stiffness of the resonant elements may be different.

The resonant elements may be coupled together by connecting means in any convenient way, e.g. on generally stiff stubs, between the elements. The resonant elements are preferably coupled at coupling points which enhance the modality of the transducer and/or enhance the coupling at the site to which the force is to be applied. Parameters of the connecting means may be selected to enhance the modal distribution in the resonant element. The resonant elements may be arranged in a stack. The coupling points may be axially aligned.

The resonant element may be plate-like or may be curved out of planar. A plate-like resonant element may be formed with slots or discontinuities to form a multi-resonant system. The resonant element may be in the shape of a beam, trapezoidal, hyperelliptical or may be generally disc shaped. Alternatively, the resonant element may be rectangular and may be curved out of the plane of the rectangle about an axis along the short axis of symmetry.

The resonant element may be modal along two substantially normal axes, each axis having an associated fundamental frequency. The ratio of the two fundamental frequencies may be adjusted for best modal distribution, e.g. 9:7 (~1.286:1).

As examples, the arrangement of such modal transducer may be any of: a flat piezoelectric disc; a combination of at least two or preferably at least three flat piezoelectric discs; two coincident piezoelectric beams; a combination of multiple coincident piezoelectric beams; a curved piezoelectric plate; a combination of multiple curved piezoelectric plates or two coincident curved piezoelectric beams.

The interleaving of the distribution of the modes in each resonant element may be enhanced by optimising the frequency ratio of the resonant elements, namely the ratio of the frequencies of each fundamental resonance of each resonant element. Thus, the parameter of each resonant element relative to one another may be altered to enhance the overall modal distribution of the transducer.

When using two active resonant elements in the form of beams, the two beams may have a frequency ratio (i.e. ratio of fundamental frequency) of 1.27:1. For a transducer comprising three beams, the frequency ratio may be 1.315:1.147:1. For a transducer comprising two discs, the frequency ratio may be 1.1+/–0.02 to 1 to optimise high order modal density or may be 3.2 to 1 to optimise low order modal density. For a transducer comprising three discs, the frequency ratio may be 3.03:1.63:1 or may be 8.19:3.20:1.

The parameters of the coupling means may be selected to enhance the distribution of modes in the resonant element in the operative frequency range. The coupling means may be vestigial, e.g. a controlled layer of adhesive.

The coupling means may be positioned asymmetrically with respect to the conduction interface so that the transducer is coupled asymmetrically. The asymmetry may be achieved in several ways, for example by adjusting the position or orientation of the transducer with respect to axes of symmetry in the conduction interface or the transducer.

The coupling means may form a line of attachment. Alternatively, the coupling means may form a point or small local area of attachment where the area of attachment is small in relation to the size of the resonant element. The coupling means may be in the form of a stub and have a small diameter, e.g. 3 to 4 mm. The coupling means may be low mass.

The coupling means may comprise more than one coupling point and may comprise a combination of points and/or lines of attachment. For example, two points or small local areas of attachment may be used, one positioned near centre and one positioned at the edge of the active element. This may be useful for plate-like transducers which are generally stiff and have high natural resonance frequencies.

Alternatively only a single coupling point may be provided. This may provide the benefit, in the case of a multi-resonant element array, that the output of all the resonant elements is summed through the single coupling means so that it is not necessary for the output to be summed by the load. The coupling means may be chosen to be located at an anti-node on the resonant element and may be chosen to deliver a constant average force with frequency.

The coupling means may be positioned away from the centre of the resonant element.

The position and/or the orientation of the line of attachment may be chosen to optimise the modal density of the resonant element. The line of attachment is preferably not coincident with a line of symmetry of the resonant element. For example, for a rectangular resonant element, the line of attachment may be offset from the short axis of symmetry (or centre line) of the resonant element. The line of attachment may have an orientation which is not parallel to a symmetry axis of the conduction interface.

The shape of the resonant element may be selected to provide an off-centre line of attachment which is generally at the centre of mass of the resonant element. One advantage of this embodiment is that the transducer is attached at its centre of mass and thus there is no inertial imbalance. This may be achieved by an asymmetric shaped resonant element which may be in the shape of a trapezium or trapezoid.

For a transducer comprising a beam-like or generally rectangular resonant element, the line of attachment may extend across the width of the resonant element. The area of the resonant element may be small relative to that of the acoustic radiator.

The operative frequency range may be over a relatively broad frequency range and may be in the audio range and/or ultrasonic range. Thus, operation over a range greater than the range defined by a single dominant, natural resonance of the transducer may be achieved. The lowest frequency in the operative frequency range is preferably above a predetermined lower limit which is about the fundamental resonance of the transducer.

BRIEF DESCRIPTION OF DRAWINGS

Examples that embody the best mode for carrying out the invention are described in detail below and are diagrammatically illustrated in the accompanying drawings in which.

DETAILED DESCRIPTION

Figure 1A:
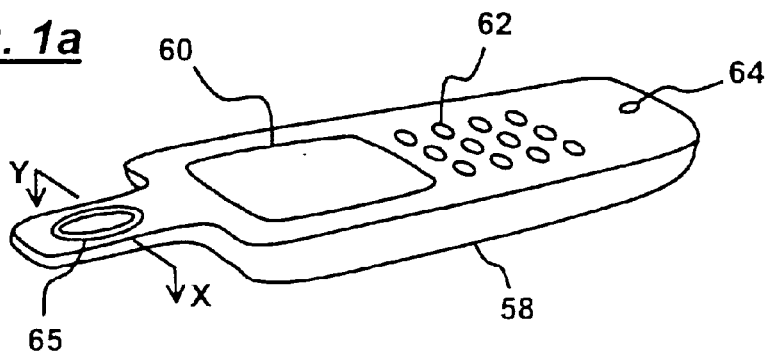
FIG. 1A shows a schematic view of a mobile telephone embodying the present invention.
Figure 1B:
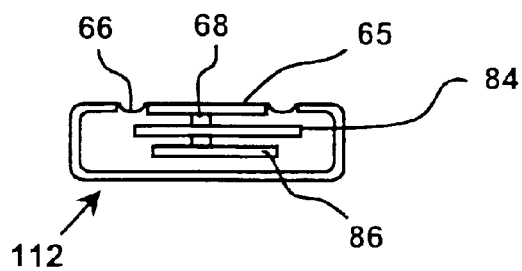
FIG. 1B is a section along line A—A of FIG. 1A.

FIGS. 1A and 1B show a mobile handset (58), e.g. for use as a mobile or cellular phone, which comprises a microphone (64), buttons (62) forming a keypad, and a screen (60). The microphone is mounted in one end of the handset and the opposed end of the handset (58) is formed with an extension. An intendedly modal transducer or distributed mode transducer as hereinbefore described and as described in WO01/54450 and corresponding U.S. application Ser. No. 09/768,002, is mounted in the extension so as to drive a conduction interface (65).

As shown more clearly in FIG. 1B, the distributed mode transducer comprises upper and lower bimorph beams (84) and (86), the upper beam (84) being connected to the conduction interface (65) via a short stub (68) which extends across the width of the beams. The stub may be 1–2 mm wide and high and may be made from hard plastics and/or metal with suitable insulating layers to prevent electrical short circuits.

The beams are of unequal lengths with the upper beam (84) of length 36 mm being longer than the lower beam (86) of length 32 mm. Both beams have a width 7.5 mm and a weight of 1.6 grams. Each beam consists of three layers, namely two outer layers of piezoelectric ceramic material, e.g. PZT 5H, sandwiching a central brass vane. The outer layers may have a thickness of 150 microns and the central vane, a thickness of 100 microns. The outer layers may be attached to the brass vane by adhesive layers which are typically 10–15 microns in thickness.

The conduction interface (65) is surrounded by a flexible surround (66), which supports the distributed mode transducer in the housing. The flexible surround prevents too much structure borne vibration being introduced into the body of the mobile handset by the distributed mode transducer.

Figure 2A:
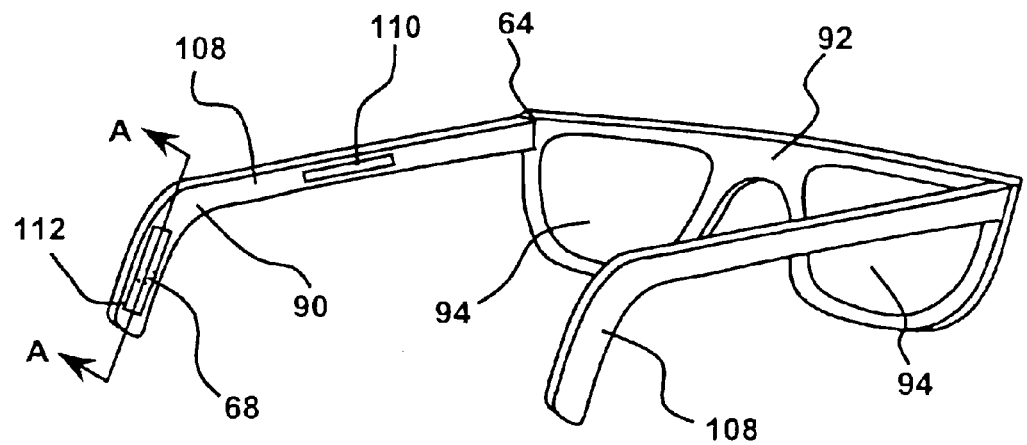
FIG. 2A shows a schematic view of a pair of spectacles embodying the present invention.
Figure 2B:
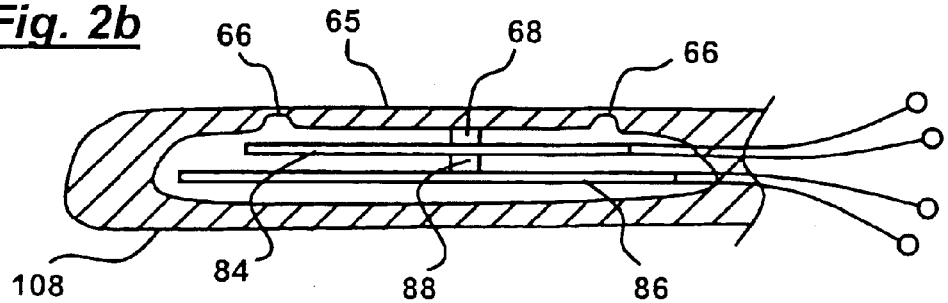
FIG. 2B is a section along line A—A of FIG. 2A.

FIGS. 2A and 2B show a pair of spectacles (90) comprising a frame (92) supporting two lenses (94) and two arms (108) which are hinged to the frame (92) and which support the spectacles on a user's ear (not shown). A microphone (64) is mounted in one arm (108) adjacent the frame (94) and an intendedly modal or distributed mode transducer (112) as hereinbefore described and as described in WO01/54450 and corresponding U.S. application Ser. No. 09/768,002, is mounted in the same arm distanced from the microphone (64).

In use, the microphone (64) picks up the sound which is transmitted to and reproduced by the transducer without any airborne acoustic output. The transducer (112) is connected to a conduction interface (65), which is suspended from the arm (108) by a suspension in the form of a flexible surround (66). The compliance of this suspension is adjusted so that no structure borne vibration is transmitted through the arm (108) to the microphone (64). Thus a common problem of hearing aids, namely that of local feedback may be reduced.

As shown more clearly in FIG. 2B, the distributed mode transducer (112) comprises upper and lower beams (84) and (86) joined by a stub (88). The upper beam (84) is connected to the conduction interface (65) via a short stub (68). The beams are of unequal lengths with the upper beam (84) being longer than the lower beam (86). Wires are shown which connect the beams with an input source.

An optional amplifier (110) is shown mounted in the same arm (108) at a position between the microphone (64) and the transducer (112). The amplifier may be powered by a battery (not shown).

Figure 3:
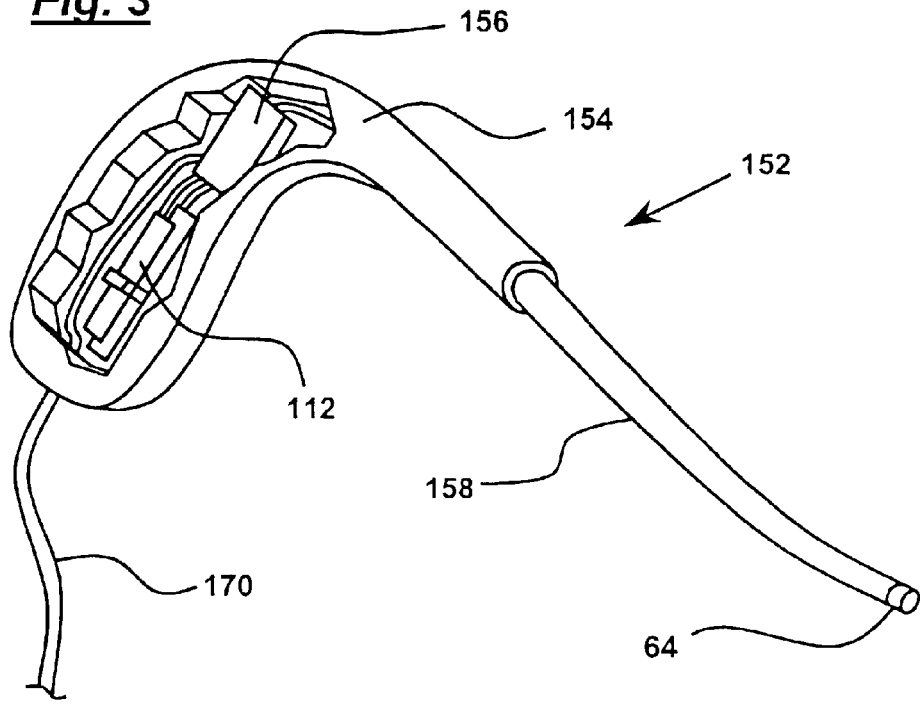
FIG. 3 shows a schematic view of a hearing aid/head set embodying the present invention.

FIG. 3 shows an "over the ear" headset (152) which comprises a body (154) having an enclosure (156) which normally houses an amplifier, battery and signal processing and a cable (170) which feeds input and output signals to the enclosure. A distributed mode transducer (112) as hereinbefore described and as described in WO01/54450 and corresponding U.S. application Ser. No. 09/768,002 is mounted in the body adjacent the enclosure (156). The transducer may be similar to those depicted in FIGS. 1B and 2B.

The body also comprises an extension (158) and a microphone (64) is mounted at an end of the extension which is distal from the body. In use the enclosure would be behind a user's ear and the microphone is adjusted to be close to the speaker's mouth.

The remaining figures show alternative transducers which may be used in conjunction with the embodiments shown in FIGS. 1 to 3.

Figure 4:
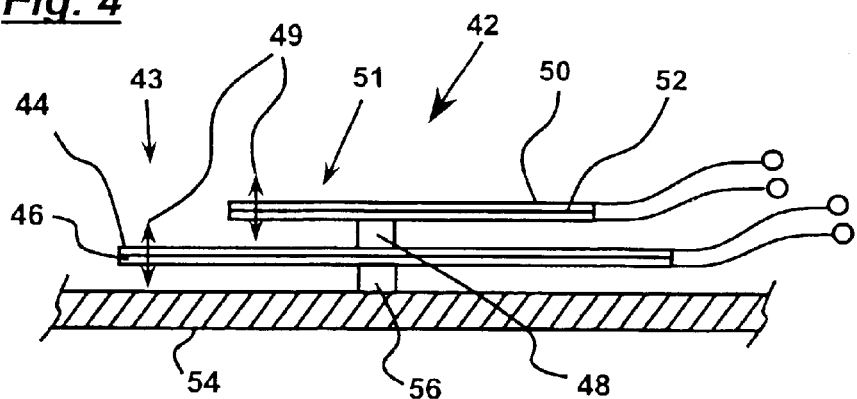
FIGS. 4 to 10 are side views of alternative modal transducers which may be used in the present invention.

FIG. 4 shows a transducer (42) which comprises a first piezoelectric beam (43) on the back of which is mounted a second piezoelectric beam (51) by connecting means in the form of a stub (48) located at the centre of both beams. Each beam is a bi-morph. The first beam (43) comprises two layers (44,46) of piezoelectric material and the second beam (51) comprises two layers (50,52). The poling directions of each layer of piezoelectric material are shown by arrows (49). Each layer (44, 50) has an opposite poling direction to the other layer (46, 52) in the bi-morph. The bimorph may also comprise a central conducting vane which allows a parallel electrical connection as well as adding a strengthening component to the ceramic piezoelectric layers. Each layer of each beam may be made of the same/different piezoelectric material. Each layer is generally of a different length.

The first piezoelectric beam (43) is mounted on a structure (54), e.g. a conduction interface, by coupling means in the form of a stub (56) located at the centre of the first beam. By mounting the first beam at its centre only the even order modes will produce output. By locating the second beam behind the first beam, and coupling both beams centrally by way of a stub they can both be considered to be driving the same axially aligned or co-incident position.

When elements are joined together, the resulting distribution of modes is not the sum of the separate sets of frequencies, because each element modifies the modes of the other. The two beams are designed so that their individual modal distributions are interleaved to enhance the overall modality of the transducer. The two beams add together to produce a useable output over a frequency range of interest. Local narrow dips occur because of the interaction between the piezoelectric beams at their individual even order modes.

The second beam may be chosen by using the ratio of the fundamental resonance of the two beams. If the materials and thicknesses are identical, then the ratio of frequencies is just the square of the ratio of lengths. If the higher f0 (fundamental frequency) is simply placed half way between f0 and f1 of the other, larger beam, f3 of the smaller beam and f4 of the lower beam coincide.

Plotting a graph of a cost function against ratio of frequency for two beams shows that the ideal ratio is 1.27:1, namely where the cost function is minimised at point. This ratio is equivalent to the "golden" aspect ratio (ratio of f02:f20) described in WO97/09842 and corresponding U.S. Pat. No. 6,332,029. The method of improving the modality of a transducer may be extended by using three piezoelectric beams in the transducer. The ideal ratio is 1.315:1.147:1.

The method of combining active elements, e.g. beams, may be extended to using piezoelectric discs. Using two discs, the ratio of sizes of the two discs depends upon how many modes are taken into consideration. For high order modal density, a ratio of fundamental frequencies of about 1.1+/−0.02 to 1 may give good results. For low order modal density (i.e. the first few or first five modes), a ratio of fundamental frequencies of about 3.2:1 is good. The first gap comes between the second and third modes of the larger disc.

Since there is a large gap between the first and second radial modes in each disc, much better interleaving is achieved with three rather than with two discs. When adding a third disc to the double disc transducer, the obvious first target is to plug the gap between the second and third modes of the larger disc of the previous case. However, geometric progression shows that this is not the only solution. Using fundamental frequencies of f0, $\alpha$.f0 and $\alpha^2$.f0, and plotting rms ($\alpha$ .$\alpha^2$) there exist two principal optima for $\alpha$. The values are about 1.72 and 2.90, with the latter value corresponding to the obvious gap-filling method.

Using fundamental frequencies of f0, $\alpha$.f0 and $\beta$.f0 so that both scalings are free and using the above values of $\alpha$ as seed values, slightly better optima are achieved. The parameter pairs ($\alpha$.$\beta$ . . . are (1.63, 3.03) and (3.20, 8.19). These optima are quite shallow, meaning that variations of 10%, or even 20%, in the parameter values are acceptable.

An alternative approach for determining the different discs to be combined is to consider the cost as a function of the ratio of the radii of the three discs. The cost functions may be RSCD (ratio of sum of central differences), SRCD (sum of the ratio of central differences) and SCR (sum of central ratios). For a set of modal frequencies, $f_0, f_1, f_n, \ldots f_N$, these functions are defined as:

RSCD (R sum CD):

$$RSCD = \frac{\frac{1}{N-1}\sum_{n=1}^{N-1}(f_{n+1} + f_{n-1} - 2f_n)^2}{f_0}$$

SCRD (sum RCD):

$$SRCD = \frac{1}{N-1}\sum_{n=1}^{N-1}\left(\frac{f_{n+1} + f_{n-1} - 2f_n}{f_n}\right)^2$$

CR:

$$SCR = \frac{1}{N-1}\sum_{n=1}^{N-1}\left(\frac{f_{n+1} \cdot f_{n-1}}{(f_n)^2}\right)$$

The optimum radii ratio, i.e. where the cost function is minimised, is 1.3 for all cost functions. Since the square of the radii ratio is equal to the frequency ratio, for these identical material and thickness discs, the results of 1.3*1.3= 1.69 and the analytical result of 1.67 are in good agreement.

Figure 5:
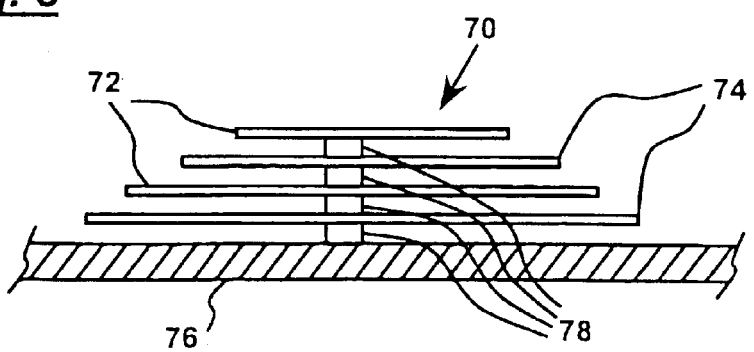

Alternatively or additionally, passive elements may be incorporated into the transducer to improve its overall modality. The active and passive elements may be arranged in a cascade. FIG. 5 shows a multiple disc transducer (70) comprising two active piezoelectric elements (72) stacked with two passive resonant elements (74), e.g. thin metal plates so that the modes of the active and passive elements are interleaved.

The elements are connected by connecting means in the form of stubs (78) located at the centre of each active and passive element. The elements are arranged concentrically. Each element has different dimensions with the smallest and largest discs located at the top and bottom of the stack, respectively. The transducer (70) is mounted on a load device (76), e.g. a conductive interface, by coupling means in the form of a stub (78) located at the centre of the first passive device which is the largest disc.

The method of improving the modality of a transducer may be extended to a transducer comprising two active elements in the form of piezoelectric plates. Two plates of dimensions (1 by α) and (α by α²) are coupled at (3/7, 4/9). The frequency ratio is therefore about 1.3:1 (1.14×1.14= 1.2996).

Figure 6:
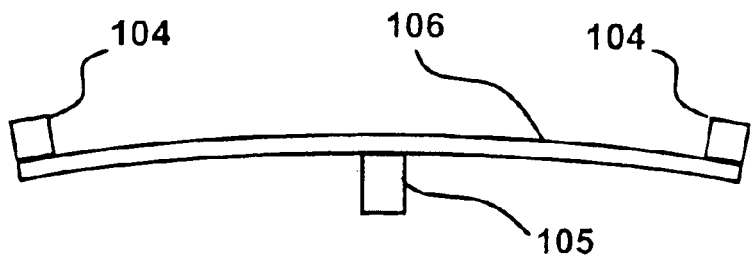
Figure 7:
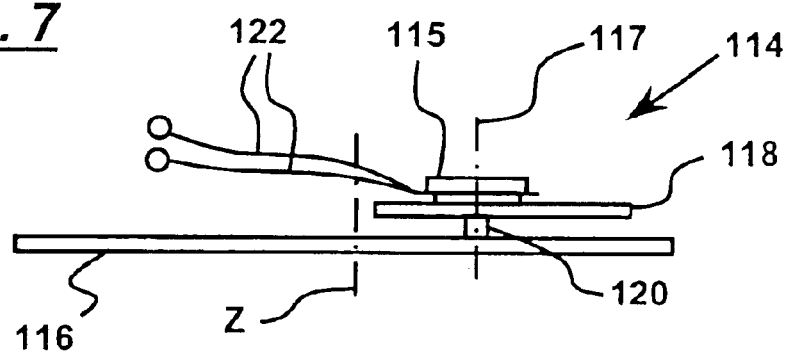

As shown in FIG. 6, small masses (104) may be mounted at the end of the piezoelectric transducer (106) having coupling means (105). In FIG. 7, the transducer (114) is an inertial electrodynamic moving coil exciter, e.g. as described in WO97/09842 and corresponding U.S. Pat. No. 6,332,029, having a voice coil forming an active element (115) and a passive resonant element in the form of a modal plate (118). The active element (115) is mounted on the modal plate (118) and off-centre of the modal plate.

The modal plate (118) is mounted on the panel (116) by a coupler (120). The coupler is aligned with the axis (117) of the active element but not with the axis (Z) normal to the plane of the panel (116). Thus the transducer is not coincident with the panel axis (Z). The active element is connected to an electrical signal input via electrical wires (122). The modal plate (118) is perforate to reduce the acoustic radiation therefrom and the active element is located off-centre of the modal plate (118), for example, at the optimum mounting position, i.e. (3/7, 4/9).

Figure 8:
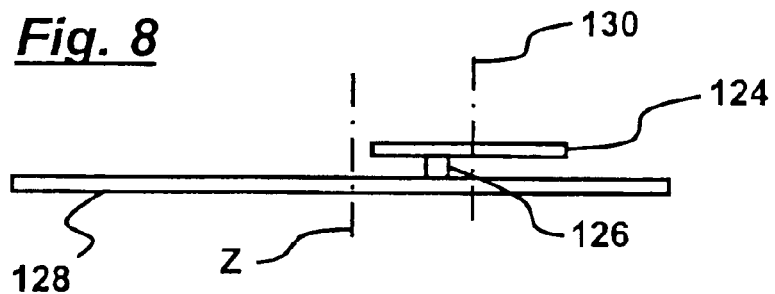

FIG. 8 shows a transducer (124) comprising an active piezoelectric resonant element which is mounted by coupling means (126) in the form of a stub to a conduction interface (128). Both the transducer (124) and conduction interface (128) have ratios of width to length of 1:1.13. The coupling means (126) is not aligned with any axes (130, Z) of the transducer or the conduction interface. Furthermore, the placement of the coupling means is located at the optimum position, i.e. off-centre with respect to both the transducer (124) and the conduction interface (128).

Figure 9:
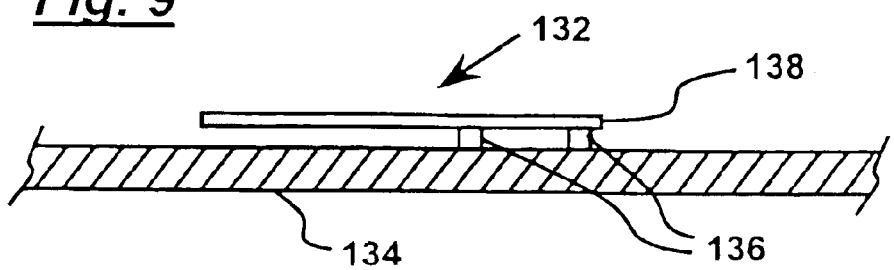

FIG. 9 shows a transducer (132) in the form of active piezoelectric resonant element in the form of a beam. The transducer (132) is coupled to a conduction interface (134) by two coupling means (136) in the form of stubs. One stub is located towards an end (138) of the beam and the other stub is located towards the centre of the beam.

Figure 10:
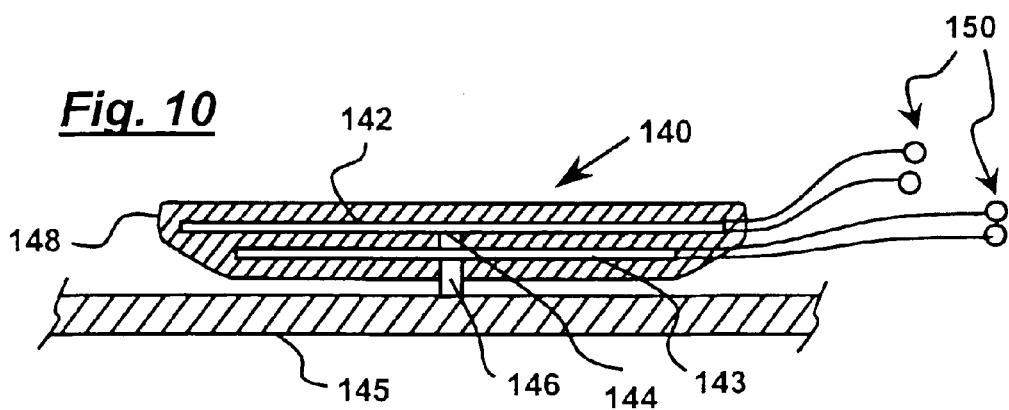

FIG. 10 shows a transducer (140) comprising two active resonant elements (142,143) coupled by connecting means (144) and an enclosure (148) which surrounds the connecting means (144) and the resonant elements (142). The transducer is thus made shock and impact resistant. The enclosure is made of a low mechanical impedance rubber or comparable polymer so as not to impede the transducer operation. If the polymer is water resistant, the transducer (140) may be made waterproof.

The upper resonant element (142) is larger than the lower resonant element (143) which is coupled to a panel (145) via a coupling means in the form of a stub (146). The stub is located at the centre of the lower resonant element (143). The power couplings (150) for each active element extend from the enclosure to allow good audio attachment to a load device (not shown).

Figure 11:
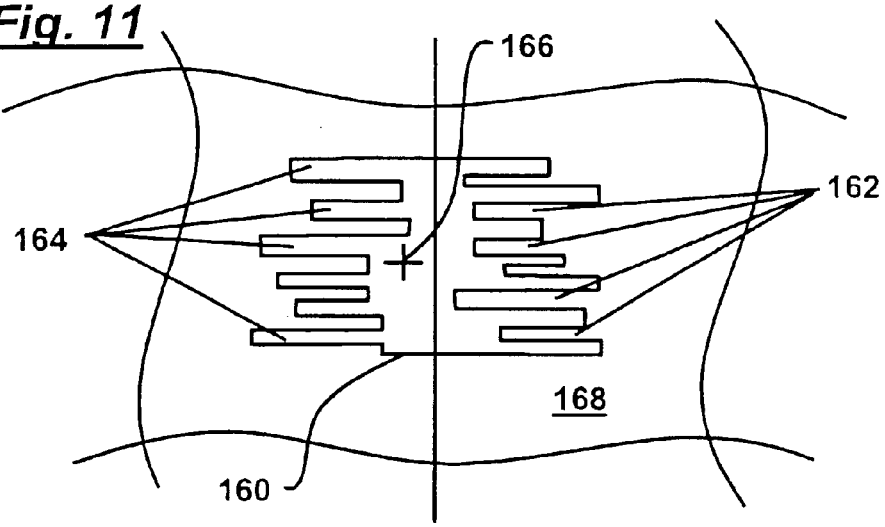
FIG. 11 is a plan view of an alternative modal transducer which may be used in the present invention.

FIG. 11 shows a transducer (160) in the form of a plate-like active resonant element. The resonant element is formed with slots (162) which define fingers (164) and thus form a multi-resonant system. The resonant element is mounted on a conduction interface (168) by a coupling means in the form of a stub (166).

Figure 12A:
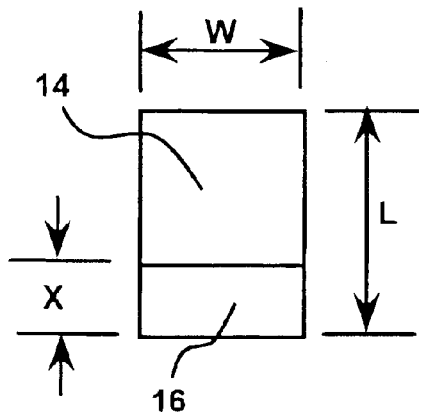
FIG. 12A is a schematic plan view of a parameterised model of a transducer which may be used in the present invention.
Figure 12B:
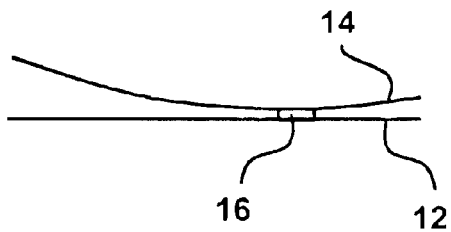
FIG. 12B is a section perpendicular to the line of attachment of the transducer of FIG. 12A.

In FIGS. 12A and 12B, the transducer (14) is rectangular with out-of-plane curvature and is a pre-stressed piezoelectric transducer of the type disclosed in U.S. Pat. No. 5,632,841 (International patent application WO 96/31333) and produced by PAR Technologies Inc under the trade name NASDRIV. Thus the transducer (14) is an active resonant element. The transducer has width (W) and length (L) and the position (x) of the attachment point (16).

The curvature of the transducer (14) means that the coupling means (16) is in the form of a line of attachment. Thus the transducer (14) is attached to the panel (12) only along line A—A. When the transducer is mounted along a line of attachment along the short axis through the centre, the resonance frequencies of the two arms of the transducer are coincident. The optimum suspension point may be modelled and has the line of attachment at 43% to 44% along the length of the resonant element. The cost function (or measure of "badness") is minimised at this value; this corresponds to an estimate for the attachment point at 4/9ths of the length. Furthermore, computer modelling showed this attachment point to be valid for a range of transducer widths. A second suspension point at 33% to 34% along the length of the resonant element also appears suitable.

By plotting a graph of cost (or rms central ratio) against aspect ratio (AR=W/2L) for a resonant element mounted at 44% along its length, the optimum aspect ratio may be determined to be 1.06+/−0.01 to 1 since the cost function is minimised at this value.

The optimum angle of attachment θ to the panel (12) may be determined using two "measures of badness" to find the optimum angle. For example, the standard deviation of the log (dB) magnitude of the response is a measure of "roughness". Such figures of merit/badness are discussed in International Application WO99/41939 and corresponding U.S. application Ser. No. 09/246,967, to the present applicants. For an optimised transducer, namely one with aspect ratio 1.06:1 and attachment point at 44% using modelling, rotation of the line of attachment (16) will have a marked effect since the attachment position is not symmetrical. There is a preference for an angle of about 270°, i.e. with the longer end facing left.

Figure 13A:
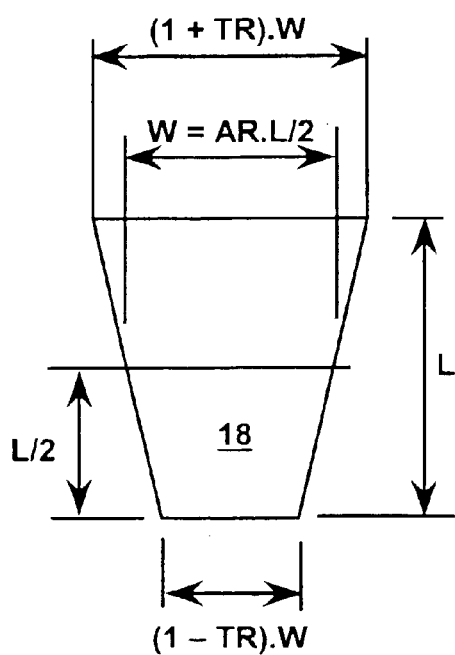
FIG. 13A is a schematic plan view of a parameterised model of a transducer which may be used in the present invention and FIG. 13B is a section perpendicular to the line of attachment of the transducer of FIG. 13A.
Figure 13B:
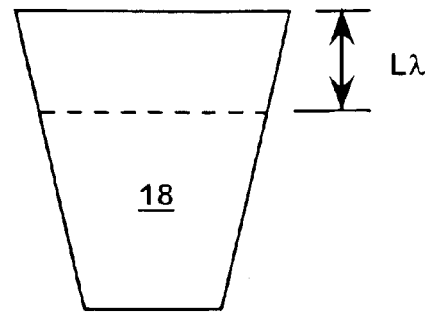

FIGS. 13A and 13B show an asymmetrically shaped transducer (18) in the form of a resonant element having a trapezium shaped cross-section. The shape of a trapezium is controlled by two parameters, AR (aspect ratio) and TR (taper ratio). AR and TR determine a third parameter, λ, such that some constraint is satisfied—for example, equal mass either side of the line.

The constraint equation for equal mass (or equal area) is as follows;

$$\int_0^\lambda \left(1 + 2TR\left(\frac{1}{2} - \xi\right)\right)d\xi = \int_\lambda^1 \left(1 + 2TR\left(\frac{1}{2} - \xi\right)\right)d\xi$$

The above may readily be solved for either TR or λ as the dependent variable, to give:

$$TR = \frac{1-2\lambda}{2\lambda(1-\lambda)} \text{ or } \lambda = \frac{1+TR-\sqrt{1+TR^2}}{2TR} \approx \frac{1}{2} - \frac{TR}{4}$$

Equivalent expressions are readily obtained for equalising the moments of inertia, or for minimising the total moment of inertia.

The constraint equation for equal moment of inertia (or equal $2^{nd}$ moment of area) is as follows;

$$\int_0^\lambda \left(1 + 2TR\left(\frac{1}{2} - \xi\right)\right)(\lambda - \xi)^2 d\xi = \int_\lambda^1 \left(1 + 2TR\left(\frac{1}{2} - \xi\right)\right)(\xi - \lambda)^2 d\xi$$

$$TR = \frac{(\lambda^2 - \lambda + 1)(2\lambda - 1)}{2\lambda^4 - 4\lambda^3 + 2\lambda - 1} \text{ or } \lambda \approx \frac{1}{2} - \frac{TR}{8}$$

The constraint equation for minimum total moment of inertia is $$\frac{d}{d\lambda}\left(\int_0^1 \left(1 + 2TR\left(\frac{1}{2} - \xi\right)\right)(\lambda - \xi)^2 d\xi\right) = 0$$

$$TR = 3 - 6\lambda \text{ or } \lambda = \frac{1}{2} - \frac{TR}{6}$$

A cost function (measure of "badness") was plotted for the results of 40 FEA runs with AR ranging from 0.9 to 1.25, and TR ranging from 0.1 to 0.5, with λ constrained for equal mass. The transducer is thus mounted at the centre of mass. The results are tabulated below and show that there is an optimum shape with AR=1 and TR=0.3, giving λ at close to 43%.

| tr | λ | 0.9 | 0.95 | 1 | 1.05 | 1.1 | 1.15 | 1.2 | 1.25 |
|---|---|---|---|---|---|---|---|---|---|
| 0.1 | 47.51% | 2.24% | 2.16% | 2.16% | 2.24% | 2.31% | 2.19% | 2.22% | 2.34% |
| 0.2 | 45.05% | 1.59% | 1.61% | 1.56% | 1.57% | 1.50% | 1.53% | 1.66% | 1.85% |
| 0.3 | 42.66% | 1.47% | 1.30% | 1.18% | 1.21% | 1.23% | 1.29% | 1.43% | 1.59% |
| 0.4 | 40.37% | 1.32% | 1.23% | 1.24% | 1.29% | 1.25% | 1.29% | 1.38% | 1.50% |
| 0.5 | 38.20% | 1.48% | 1.44% | 1.48% | 1.54% | 1.56% | 1.58% | 1.60% | 1.76% |

One advantage of a trapezoidal transducer is thus that the transducer may be mounted along a line of attachment which is at its centre of gravity/mass but is not a line of symmetry. Such a transducer would thus have the advantages of improved modal distribution, without being inertially unbalanced. The two methods of comparison used previously again select 270° to 300° as the optimum angle of orientation.

The transducer used in the present invention may be seen as the reciprocal of a distributed mode panel, e.g. as described in WO97/09842 and corresponding U.S. Pat. No. 6,332,029, in that the transducer is designed to be a distributed mode object.

It should be understood that this invention has been described by way of examples only and that a wide variety of modifications can be made without departing from the scope of the invention as described in the accompanying claims.

What is claimed is:

1. A communication device comprising:
   a microphone,
   a conduction interface,
   an electromechanical force transducer mounted to the conduction interface to drive the interface to conduct sound to a user by bone conduction, wherein the transducer has an intended operative frequency range and comprises a resonant element having a frequency distribution of modes in the operative frequency range, and
   a coupler for mounting transducer to the interface, wherein the parameters of the resonant element are selected to enhance the distribution of modes in the resonant element in the operative frequency range, and wherein the distribution of modes in the resonant element has a density of modes which is sufficient for the resonant element to provide an effective mean average force which is substantially constant with frequency.

2. A communication device according to claim 1, wherein the conduction interface is mounted adjacent a user's mastoid bone.

3. A communication device according to claim 1, wherein the coupler is attached to the resonant element at a position which is beneficial for coupling modal activity of the resonant element to the interface.

4. A communication device according to claim 1, wherein the modes are distributed substantially even over the intended operative frequency range.

5. A communication device according to claim 2, comprising:
   a casing having an extension remote from the microphone, the transducer being mounted in the extension whereby in use the transducer is adjacent a user's mastoid bone.

6. A communication device according to claim 1, wherein the resonant element is modal along two substantially normal axes, each axis having an associated fundamental frequency and the ratio of the two associated fundamental frequencies being adjusted for best modal distribution.

7. A communication device according to claim 6, wherein the ratio of the two fundamental frequencies is about 9:7.

8. A communication device according to claim 1, wherein the transducer comprises a plurality of resonant elements each having a distribution of modes, the modes of the resonant element being arranged to interleave in the operative frequency range whereby the distribution of modes in the transducer as a whole device is enhanced.

9. A communication device according to claim 1, wherein the resonant element is plate-like.

10. A communication device according to claim 1, wherein the shape of the resonant element is selected from the group consisting of beam-like, trapezoidal, hyperelliptical, generally disc shape and rectangular.

11. A communication device according to claim 1, wherein the resonant element is plate-like.

12. A communication device according to claim 1, wherein the shape of the resonant element is selected from the group consisting of beam-like, trapezoidal, hyperelliptical, generally disc shaped and rectangular.

13. A communication device according to claim 1, wherein the communication device is selected by the group consisting of a telephone, a hearing aid, eyeglasses, and a headset.

14. A communication device comprising:
   a microphone,
   a conduction interface,
   an electromechanical force transducer to the conduction interface to drive the interface to conduct sound to user by bone conduction, wherein the transducer has an intended operative frequency range and comprises a resonant element having a frequency distribution of modes in the operative frequency range, and a coupler for mounting the transducer to the interface, wherein the resonant element is modal along two substantially normal axes, each axis having an associated fundamental frequencies and the ratio of two associated fundamental frequencies being adjusted for best modal distribution.

15. A communication device according to claim 14, wherein the ratio of two fundamental frequencies is about 9:7.

16. A communication device comprising:

a microphone, a conduction interface, an electromechanical force transducer mounted to the conduction interface to drive the interface to conduct sound to a user by bone conduction, wherein the transducer has an intended operative frequency range and comprises a resonant element having a frequency distribution of modes in the operative frequency range, and a coupler for mounting the transducer to the interface, wherein the transducer comprises a plurality of resonant elements each having a distribution of modes of the resonant elements being arranged to interleave in the operative frequency range whereby the distribution of modes in the transducer as a whole device is enhanced.

* * * * *